United States Patent
Tai et al.

(10) Patent No.: US 10,713,155 B2
(45) Date of Patent: Jul. 14, 2020

(54) BIASED SAMPLING METHODOLOGY FOR WEAR LEVELING

(71) Applicant: Micron Technology, Inc., Boise, ID (US)

(72) Inventors: Ying Yu Tai, Mountain View, CA (US); Jiangli Zhu, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/039,648

(22) Filed: Jul. 19, 2018

(65) Prior Publication Data

US 2020/0026643 A1 Jan. 23, 2020

(51) Int. Cl.
*G06F 12/02* (2006.01)
*G06F 12/06* (2006.01)

(52) U.S. Cl.
CPC .......... *G06F 12/0215* (2013.01); *G06F 12/06* (2013.01); *G06F 2212/217* (2013.01)

(58) Field of Classification Search
CPC . G06F 12/0215; G06F 12/06; G06F 2212/217
See application file for complete search history.

(56) References Cited

U.S. PATENT DOCUMENTS

| | | | |
|---|---|---|---|
| 7,139,863 B1* | 11/2006 | Defouw | G06F 12/0246 711/103 |
| 8,296,539 B2* | 10/2012 | Chen | G06F 12/0246 711/103 |
| 2010/0318719 A1* | 12/2010 | Keays | G06F 12/0246 711/103 |
| 2011/0246709 A1 | 10/2011 | Chen et al. | |
| 2011/0271046 A1 | 11/2011 | Iyer et al. | |
| 2011/0320688 A1* | 12/2011 | Lee | G06F 12/0246 711/103 |
| 2013/0339574 A1 | 12/2013 | Franceschini et al. | |
| 2015/0121156 A1 | 4/2015 | Raghu et al. | |

OTHER PUBLICATIONS

PCT Application No. PCT/US2019/042454, International Search Report and Written Opinion dated Nov. 7, 2019, 9 pages.

* cited by examiner

*Primary Examiner* — Aracelis Ruiz
(74) *Attorney, Agent, or Firm* — Lowenstein Sandler LLP

(57) ABSTRACT

First data units can be sampled from a set of data units of a memory component. The first data units can be a subset of the set of data units. An initial data unit is determined from the first data units as a first candidate data unit based on a wear metric associated with the first data units. The wear metric is indicative of a level of physical wear of the first data units. A wear leveling operation can be performed in view of the first candidate data unit.

19 Claims, 5 Drawing Sheets

BIASED SAMPLING METHODOLOGY FOR WEAR LEVELING

TECHNICAL FIELD

Implementations of the disclosure relate generally to memory sub-systems, and more specifically, relate to biased sampling methodology for wear leveling in memory sub-systems.

BACKGROUND

A memory sub-system can be a storage system, such as a solid-state drive (SSD), and can include one or more memory components that store data. A memory sub-system can include memory components such as non-volatile memory components and volatile memory components. In general, a host system can utilize a memory sub-system to store data at the memory components of the memory sub-system and to retrieve data from the memory components of the memory sub-system.

BRIEF DESCRIPTION OF THE DRAWINGS

The disclosure will be understood more fully from the detailed description given below and from the accompanying drawings of various implementations of the disclosure.

DETAILED DESCRIPTION

Figure 1:
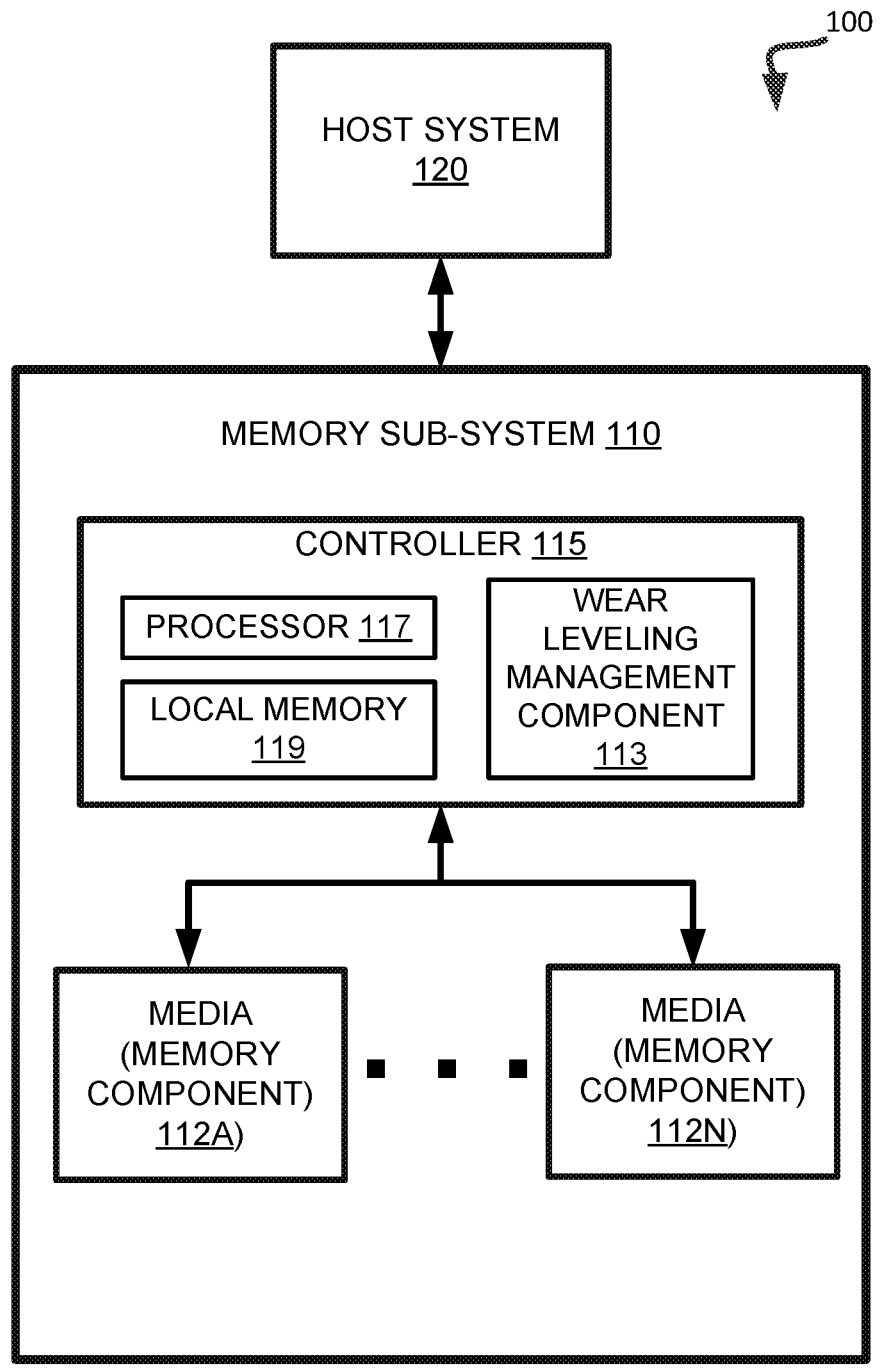
FIG. 1 illustrates an example computing environment that includes a memory sub-system, in accordance with some implementations of the disclosure.

Aspects of the present disclosure are directed to using sampling methodologies, such as biased sampling methodology, for wear leveling in memory sub-systems. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory components used by the memory sub-system can have particular properties that provide challenges in the operation of the memory sub-system. For example, some memory components, such as non-volatile memory components, have limited endurance. For example, some memory components can be written, read, or erased a finite number of times before physical wear causes the memory components to fail. Because of the limited endurance of memory components, techniques have been developed to manage wear on memory components.

One technique of managing the endurance of memory components is wear leveling. A wear leveling operation can attempt to evenly distribute the physical wear across the data units of memory components. A data unit is an amount of memory, such as a page or block of a memory component. Write counts (e.g., the number of times a write operation that writes data to a data unit is performed on the data unit during the lifetime of the data unit), read counts (e.g., the number of times a read operation that reads data from a data unit is performed on the data unit during the lifetime of the data unit), or erase counts (e.g., the number of times an erase operation that erases data from a data unit is performed on the data unit during the lifetime of the data unit) can be strong indicators of wear on the data units of memory components. Wear leveling techniques often use a sorting process to find the data unit(s) with a maximum read or write count and the data unit(s) with a minimum read count or write count. Data of a data unit having a maximum read or write count can be swapped with data of a data unit having a minimum read or write count in an attempt to evenly distribute the wear across the data units of memory components.

In executing a sorting process, some conventional memory sub-systems identify all the data units for all memory components at system start-up. A list of all the data units of the memory components is sorted to find data unit(s) with maximum read or write counts (e.g., data units with the highest counts) and data unit(s) with minimum read or write counts (e.g., data units with lowest counts). Since the number of data units of the list is large, the computing resources (e.g., processing and memory resources) used to retrieve, store, and sort the list are also large. Additionally, retrieving, storing, and sorting the large number of data units takes a proportionately large amount of time, which contributes significantly to latency of the memory sub-system.

In executing the sorting process, other conventional memory sub-systems keep a list of all the data units of memory components memory sub-system and the associated read and write counts of the data units. The list is continually updated at runtime so that at any given moment recent read and write operations are reflected in the read and write counts of the list. In such conventional memory sub-system, latency improves, but the processing and storage resources that are used increases. Both conventional memory sub-systems are complex and the computational overhead (e.g., processing and memory resources) increases as the capacity (e.g., increase in the number of data units) of the memory sub-system increases.

Aspects of the disclosure address the above and other deficiencies by sampling a subset of the data units of the memory components. The subset of the data units can be sorted in an order based on a wear metric (e.g., read count, write count, or a combination of both) associated with the subset of data units. The wear metric is indicative of a level of physical wear on the subset of data units. Responsive to sorting the subset of data units, an initial data unit can be selected from the order. The initial data unit can be a candidate data unit on which to perform a wear leveling operation. In some implementations, that above processes can be repeated to identify one or more additional candidate data units.

In some implementations, the subset of the data units can be selected using a biased sampling process. A biased sampling process increases a probability that particular data units of the memory components are sampled based on one or more characteristics associated with the particular data units. Biased sampling allows for the sampling of data units that have greater probability to be associated with higher (or lower) wear metrics as compared to an average wear metric of the data units of the memory components or compared to data units not having the one or more characteristics, and that have greater probability to benefit from a wear level operation as compared to data units associated with wear metrics that are closer to the average wear metric of the data units of the memory components. Biased sampling can also be effective in finding data units having higher or lower wear metrics without sampling or sorting all or a majority of the data units of the memory components.

Aspects of the disclosure, such as sampling a subset of data units, sorting the subset of data units in an order, and selecting a candidate data unit based on the order of the subset of data units, improves the operation of the memory sub-system by reducing latency and by reducing the memory and processing resources used to find data units with higher and lower wear metrics. Additionally, in the event of a power loss, the operation of the memory sub-system is further improved as the memory sub-system can re-initiate the wear leveling techniques described herein with only a fraction of the impact to memory and processing resources as compared to conventional memory sub-systems that would re-create and re-sort large lists of data units.

FIG. 1 illustrates an example computing environment 100 that includes a memory sub-system 110 in accordance with some implementations of the present disclosure. The memory sub-system 110 can include media, such as memory components 112A to 112N. The memory components 112A to 112N can be volatile memory components, non-volatile memory components, or a combination of such. In some implementations, the memory sub-system is a storage system. An example of a storage system is a SSD. In some implementations, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some implementations, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some implementations, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another implementation of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

In some implementations, controller 115 can include host memory translation circuitry (not shown) that includes hardware (e.g., circuitry), software (e.g., firmware), or a combination thereof that is used for translating host instructions received from host interface circuitry. The host memory translation circuitry can be configured to translate host addresses (e.g., logical addresses) to memory addresses (e.g., physical addresses) of memory components 112A-112N. For example, the host system 120 can send one or more requests (e.g., read request, write request, etc.) to controller 115. The requests can include a host command and host addresses of data on which the host command is to be performed. For instance, a read request can include a host read command and the host addresses of the data that is requested to be read. A write request can include a host write command and the host addresses of the data that is requested to be written. The host addresses can be converted by host memory translation circuitry into memory addresses, such as the physical memory addresses that identifying specific data units of the memory components 112A-112N.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear leveling management component 113 (e.g., circuitry, dedicated logic, programmable logic, firmware, etc.) to perform the operations described herein. In some implementations, the controller 115 includes at least a portion of the wear leveling management component 113. For example, the controller 115 can include a processor 117 (processing device) configured to execute instructions stored in local memory 119 for performing the operations described herein. In some implementations, the wear leveling management component 113 is part of the host system 110, an application, or an operating system.

In some implementations, the wear leveling management component 113 can sample data units from a set of data units of memory components 112A-112N. Wear leveling management component 113 can sort the data units in an order based on a wear metric associated with the data units. The wear metric can be indicative of a level of physical wear of the data units. Responsive to sorting the data units in the order, wear leveling management component 113 can select an initial data unit from the order of the data units as a candidate data unit on which to perform a wear leveling operation. Further details with regards to the operations of the characteristic component 113 are described below.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

In some implementations, controller 115 can include host memory translation circuitry (not shown) that includes hardware (e.g., circuitry), software (e.g., firmware), or a combination thereof that is used for translating host instructions received from host interface circuitry. The host memory translation circuitry can be configured to translate host addresses (e.g., logical addresses) to memory addresses (e.g., physical addresses) of memory components 112A-112N. For example, the host system 120 can send one or more requests (e.g., read request, write request, etc.) to controller 115. The requests can include a host command and host addresses of data on which the host command is to be performed. For instance, a read request can include a host read command and the host addresses of the data that is requested to be read. A write request can include a host write command and the host addresses of the data that is requested to be written. The host addresses can be converted by host memory translation circuitry into memory addresses, such as the physical memory addresses that identifying specific data units of the memory components 112A-112N.

The memory sub-system 110 can include a wear leveling management component 113 (e.g., circuitry, dedicated logic, programmable logic, firmware, etc.) to perform the operations described herein. In some implementations, the wear leveling management component 113 can sample data units from a set of data units of memory components 112A-112N. Wear leveling management component 113 can sort the data units in an order based on a wear metric associated with the data units. The wear metric can be indicative of a level of physical wear of the data units. Responsive to sorting the data units in the order, wear leveling management component 113 can select an initial data unit from the order of the data units as a candidate data unit on which to perform a wear leveling operation.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the controller 115 and decode the address to access the memory components 112A to 112N.

Figure 2:
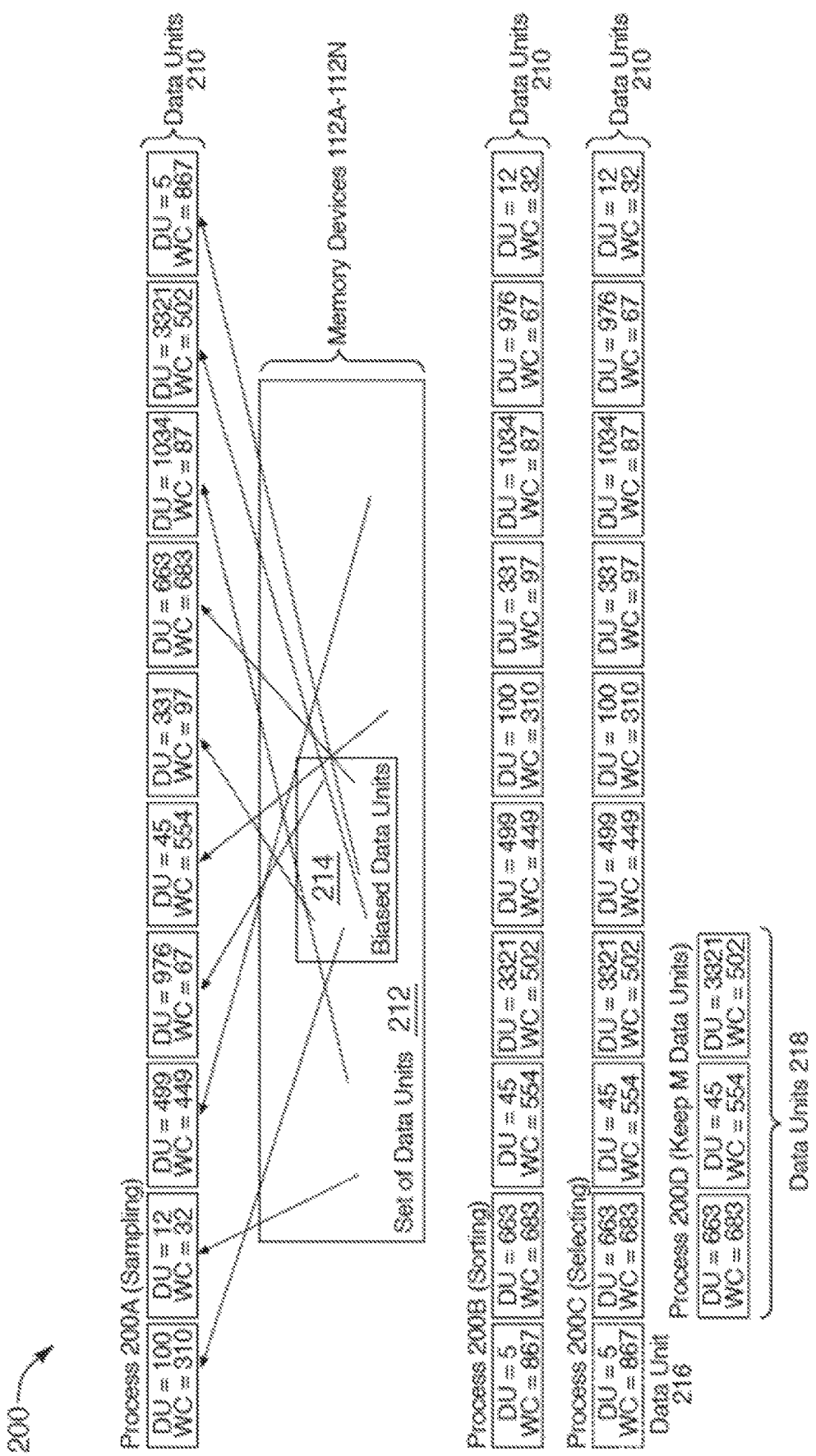
FIG. 2 illustrates an example of the selection of data units on which to perform a wear leveling operation, in accordance with some implementations of the disclosure.

FIG. 2 illustrates an example of the selection of data units on which to perform a wear leveling operation, in accordance with some implementations of the disclosure. Elements of computing environment 100 of FIG. 1 are used to help illustrate FIG. 2. It can be noted that selection process 200 is provided for purposes of illustration, rather than limitation. In implementations, selection process 200 can include some, all, none, more or different processes. In some implementations, wear leveling management component 113 can perform one or more of the operations described with respect to FIG. 2.

In implementations, a wear-leveling operation can include an operation that prolongs the service life of memory components 112A-112N (generally referred to as "memory component(s) 112" herein). For example, a wear leveling operation can attempt to evenly distribute the physical wear across the set of data units of memory components 112. A data unit can refer to an amount of physical memory of memory components 112. For example, a data unit can be a page (e.g., smallest unit of data that can be written to or read from a cross-point array) of a cross-point array of non-volatile memory or a block (e.g., smallest unit of data that can be erased in flashed-based memory) of flash-based memory. A set of data units can be the data units that make up the one or more memory components 112. For example, the set of data units of memory components 112 can be all or a majority of the pages or blocks of memory components 112.

In some implementations, a wear leveling operation can rewrite data of a data unit having a high wear metric to another data unit having a lower wear metric, or vice versa (e.g., rewrite data of a data unit having a low wear metric to another data unit having a higher wear metric). In implementations, a wear metric can be indicative of a level of physical wear on a data unit. Some examples of wear metrics can include write count, read count, or a combination of write count and read count.

In some implementations, a wear metric can include a combination of a write count and a read count. For example, the wear metric can include both the write count and the read count for a particular data unit where the write count and read count are combined using one or more equations. The physical wear on a data unit cause by a read operation can be less than the physical wear caused by a write operation. To combine read count and write count for a data unit, the read count or write count for a data unit can be normalized (e.g., adjusting counts measured by different scales to a common scale) by weighting the write count or the read count. For instance, a read count for a data unit can be multiplied by a fraction (e.g., 0.8) to determine the equivalent number of write counts that the read counts represents in terms of wear. The weighted read count and the write count for the data unit can be combined (e.g., added) and be used as a wear metric indicative of the physical wear on the particular data unit.

In some implementations, memory components 112 can include non-volatile memory components, such a non-volatile memory components that include a cross-point array of non-volatile memory cells. As noted above, a cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. It can be noted that the wear metrics for cross-point non-volatile memory may not include an erase count due to the ability of the cross-point non-volatile memory to perform write-in place operations. For example, an erase count may include the number of times a memory operation, such as an erase operation that erases data of a data unit, is performed on the data unit during the lifetime of the data unit. Aspects of the disclosure can be applied to other types of non-volatile memory components or other types of memory components.

In implementations, selection process 200 performs one or more processes of selecting one or more data units on which a wear leveling operation is performed. At process 200A, wear leveling management component 113 samples data units 210 (e.g., first data units) from the set of data units 212 of memory components 112A-112N. The data units 210 can be a subset of data units included in the set of data units 212. For example, N number of data units (e.g., 10 data units) can be sampled from the millions of data units of the set of data units 212. Each of the data units 210 is illustrated with additional metadata. For example, "DU" represents the physical address of a particular data unit 210, and "WC" represents a wear metric associated with a particular data unit 210. For purposes of illustration, rather than limitation, the wear metric (e.g., "WC") in the particular example is a wear count.

In some implementations, the data units 210 can be sampled from the set of data units 212 of the memory components 112 using a biased sampling process. The biased sampling process increases a probability that particular data units of the set of data units 212 are sampled based on one or more characteristics associated with the particular data units. In implementations, the one or more characteristics can be an attribute associated with a data unit that indicates that the data unit has a greater probability be associated with a higher (or lower) wear metric than other data units that do not share the attribute. The one or more characteristics can further indicate that a corresponding data unit has a greater probability to benefit from a wear level operation than other data units that do not share the attribute. In other implementations, other types of sampling can be implemented, such as random sampling. The sampling of data units from the set of data units 212 is further described with respect to FIG. 3.

Returning to process 200A of selection process 200, in implementations data units 210 are sampled using a biased sampling process where biased data units 214 (e.g., having particular characteristics that increase the probability that the data units are sampled) of the set of data units 212 are more likely to be sampled by the biased sampling process than the other data units of the set of data units 212. The number of biased data units 214 (e.g., pool of biased data units) are a proportionally small number of the entire number of data units of the set of data units 212 (as illustrated by the relative size of the biased data units 214), but are disproportionally sampled using the biased sampling process (e.g., 6 out of the 10 sampled data units are from the biased data unit pool). The arrows illustrate the locations from which each of the data units 210 is sampled.

At process 200B of selection process 200, wear leveling management component 113 sorts data units 210 in an order based on the wear metric associated with each of the data units 210. In the particular example, the data units 210 are sorted from the highest write count to the lowest write count (e.g., "WC=867" is first, followed by "WC=683," and so forth). As noted above, in other implementations a different wear metric can be used. It can also be noted that in other implementations, data units 210 can be sorted in an opposite order (e.g., sorted from lowest wear metric to highest wear metric).

At process 200C of selection process 200, responsive to sorting data units 210 in the order, wear leveling management component 113 selects an initial data unit 216 from the order (e.g., first data unit in the sorted order, which is the maximum or minimum depending on how the data units 210 are sorted) as a candidate data unit on which to perform a wear leveling operation. In some implementations, a first data unit (e.g., maximum wear count), the last data unit (e.g., minimum wear count), or both the first data unit and the last data unit can be selected as candidate data units.

In some implementations, a wear leveling operation is performed on the data unit 216 (e.g., without adding the data unit 216 to a record as described below). For example, responsive to selecting the data unit 216 from the order of data units 210, wear leveling management component 113 rewrites the data of data unit 216 to another data unit having a lower wear metric. The other data unit having a lower wear metric can be the last data unit of the sorted data units 210 or any other data unit having a lower wear metric (and not necessarily a data unit of data units 210).

In other implementations, data unit 216 is stored as an entry in a record (not shown). The selection process 200 (or similar) can be repeated to identify additional candidate data units that are also stored as entries in the record. The selection process 200 can be repeated to identify additional candidate data units having maximum wear counts or minimum wear counts or both (identified from the order of sorted data units). The additional candidate data units can be used to populate the entries of the record. The record can be sorted based on the wear count (similar to the sorting as described above with respect to process 200B). In some implementations, the first entry (e.g., data unit with maximum wear count) and the last entry (e.g., data unit with minimum wear count) can be used to perform a wear leveling operation. For example, the data on the data unit of the first entry can be swapped with the data on the data unit of the last entry (and the mapping table that maps logical to physical addresses can be updated accordingly). In implementations, the second entry and second to last entry can be used to perform a wear leveling operation. The process can be repeated for one or more pairs of entries of the record. It can be noted that one or more records can be maintained. For instance, one record can record data units sorted and selected based on write count, and another record can record data units sorted and selected based on read count. In another instance, one record can be maintained for data units having maximum wear counts (identified from the order of sorted data units) and another record can be maintained for data units having minimum wear counts.

In some implementations, process 200D can be performed. For example, in situations where selection process 200 (e.g., process 200A, 200B, and 200C) or similar is repeated to identify additional candidate data units, process 200D can be used. At process 200D of selection process 200, wear leveling management component 113 selects one or more subsequent data units (e.g., M number of data units) from the order of data units 210. For example, data units 218 can be selected from data units 210. Data units 218 are selected from the order of data units 210 and have the next wear metrics after data unit 216 (e.g., having the maximum wear metric).

In some implementations where selection process 200 is repeated, data units 218 can be added to the next sampled data units. For example, in subsequent iterations of selection process 200, N−M number of data units (e.g., 10−3=7 data units) are sampled from the set of data units 212. The N−M number of sampled data units (e.g., 7 data units) are combined with M number of data units (e.g., 3 data units) saved from the previous iteration of process 200 to form a group of data units (e.g., for a total of N=10 data units). The group of data units is sorted in an order based on the wear metric associated with the group of data units. An initial data unit from the order of the group of data units is selected to be a candidate data unit on which a wear leveling operation can be performed. Additional iterations of process 200 can be performed in a similar manner.

Figure 3:
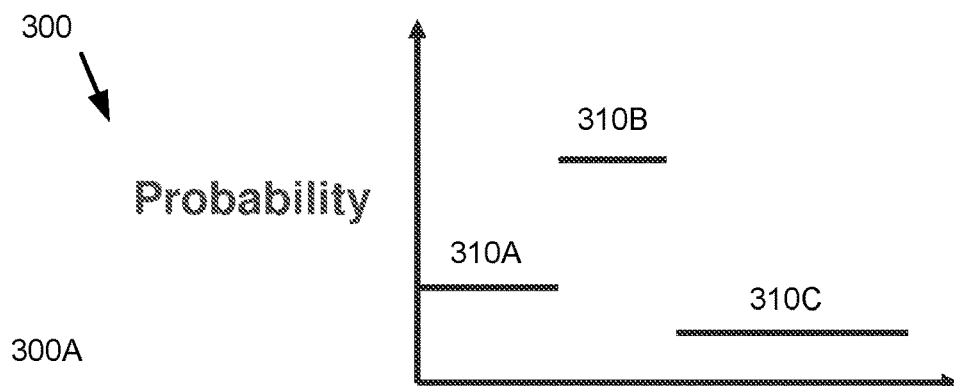
FIG. 3 illustrated an example of the sampling of data units from the set of data units of memory components, in accordance with some implementations of the disclosure.
Figure 3:
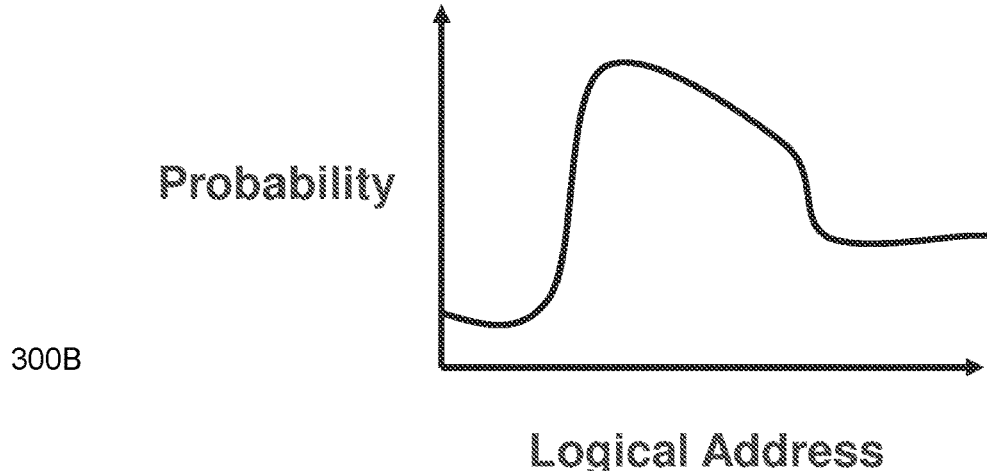
Figure 3:
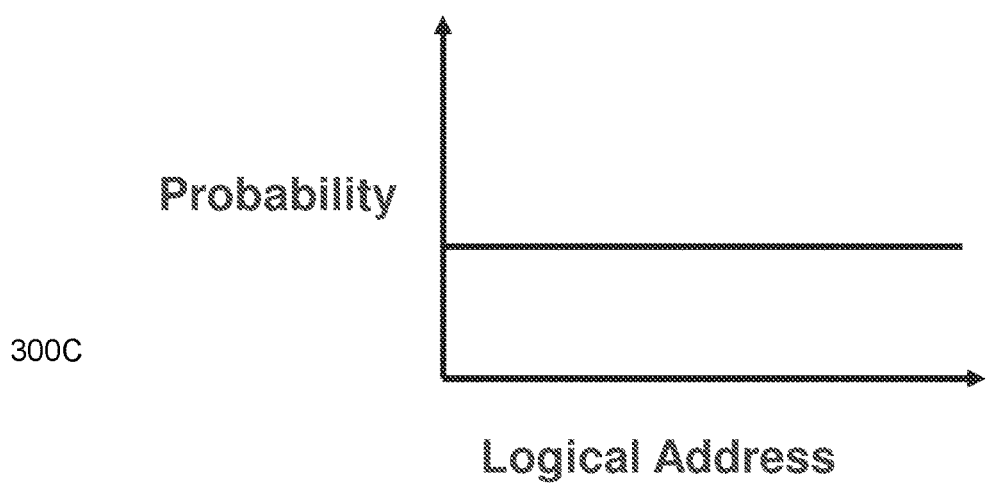

FIG. 3 illustrated examples of the sampling of data units from the set of data units of memory components, in accordance with some implementations of the disclosure. Elements of computing environment 100 of FIG. 1 and selection process 200 of FIG. 2 are used to help illustrate FIG. 3. In some implementations, wear leveling management component 113 can perform one or more of the operations described with respect to FIG. 3. Graphs 300 includes graphs 300A, 300B, and 300C, which illustrated different sampling techniques that can be used to sample data units from set of data units 212. Each of the graphs 300 has a vertical axis (e.g., probability) indicating an increased probability (in the direction of the arrow) that a data unit is sampled. Each of the graphs 300 have a horizontal axis (e.g., logical address) that indicates different data units of the set of data units 212 (where the entirety of the horizontal axis represents the set of data units 212 and points on the horizontal axis represent different data units of the set of data units 212). In the current illustration, logical address is used to differentiate the different data units of the set of data units 212 (e.g., different data units of the set of data units 212 have different logical addresses).

As noted above with respect to process 200A of selection process 200 of FIG. 2, wear leveling management component 113 samples a subset of data units (e.g., data units 210) from the set of data units 212 of memory components 112. A number of sampling techniques can be used to sample data units from the set of data units 212 of memory components 112, such as biased sampling and random sampling.

As illustrated in graphs 300A and 300B, in some implementations the data units 210 can be sampled from the set of data units 212 of the memory components 112 using a biased sampling process. A biased sampling process increases a probability that particular data units of the set of data units 212 are sampled based on one or more characteristics associated with the particular data units. That is, data units of the set of data units 212 having one or more characteristics are more likely to be sampled than other data units of set of data units 212 that do not have the one or more characteristics (e.g., data units of the set of data units 212 that are not associated with the one or more characteristics have a lower probability of being sampled than the data units with the characteristics). For example, data units 310B of set of data units 212 have the highest probability of being sampled, followed by data units 310A, and followed by data units 310C.

It can be noted that the biased sampling process can be an intentionally biased sampling process where the characteristics that increase the probability that a data unit is sampled are selected by an administrator, and the process 200A (e.g., sampling process) is adjusted to increase the probability that data units of set of data units 212 having the one or more characteristics are sampled.

In implementations, a characteristic can be an attribute associated with a data unit that indicates that the data unit has a greater probability (than other data units that do not share the attribute) to be associated with higher (or lower) wear metric (than other data units that do not share the attribute) and has a greater probability (than other data units that do not share the attribute) to benefit from a wear level operation. In some implementation, the characteristic can include one or more of data frequency. data locality, or drift time, among others.

In implementations, data frequency can refer to a frequency over a period of time at which a memory operation is performed on a data unit of set of data units 212. Read operations, write operations, erase operations, and garbage collection operations are examples of some memory operations. For instance, data units that are frequently read from, written to, or a combination of read from and written to over a period of time (e.g., number of memory operations over a period of time exceed a threshold number) can be considered "hot" data units. Hot data units can have a greater probability (than other data units that do not share the characteristic) to be associated with a higher wear metric and can have a greater probability (than other data units that do not share the characteristic) to benefit from a wear leveling operation. For example, a hot data unit is more likely to be associated with a high wear metric, which would make the hot data unit a better candidate for a wear leveling operation than a data unit associated with an average wear metric. "Cold" data units can be data units that are infrequently read from, written to, or a combination of read from and written to over a period of time (e.g., number of memory operations over a period of time is less than another threshold number). Cold data units can have a greater probability (than other data units that do not share the characteristic) to be associated with a lower wear metric and can have a greater probability (than other data units that do not share the characteristic) to benefit from a wear leveling operation (e.g., data of a cold data unit can be rewritten to a data unit with a higher wear metric). In some implementations, a biased sampling process can be used where hot data units (or cold data units) are more likely to be sampled that other data units of set of data units 212 that do not share similar characteristics.

In some implementations, data locality can refer to the location of data units, such as the logical addresses of data units. For example, memory operations can be performed with greater (or less) frequency at particular logical addresses than at other logical addresses. A data unit associated with the particular logical addresses can have a greater probability (than other data units that do not share the characteristic) to be associated with a higher (or lower) wear metric (than other data units that do not share the characteristic) and have a greater probability (than other data units that do not share the characteristic) to benefit from a wear level operation. In some implementations, a biased sampling process can be used where data units associated with particular logical addresses (e.g., data locality) are more likely to be sampled that other data units of set of data units 212 that do not share similar characteristics.

In some implementations, drift time of a data unit may refer to the amount of time between the last write of the data unit and the present time. In some implementations, the probability that the data unit contains errors increases as drift time increases. In some implementations, a biased sampling process can be used where data units associated with a higher drift time are more likely to be sampled that other data units of set of data units 212 that do not share similar characteristics.

Graph 300A and 330B show biased sampling based on data locality. Graph 300A shows were data units 310A have a same probability to be sampled, data units 310B have the same probability to be sampled, and data units 310C have the same probability to be sampled (but between the groups of data units 310 the probability is different). As noted above, the probability of data units 310B of being sampled is higher than data units 310A and 310C, and so forth. Graph 300B shows biased sampling that is non-linear.

In some implementations, a sampling technique other than biased sampling can be used to select data units 210 from set of data units 212. For example, graph 300C shows a random sampling technique where each data unit of the set of data units 212 has an equal chance of being sampled.

In some implementations, to perform biased sampling, data units can be grouped in multiple pools of data units according to one or more characteristics (e.g., data frequency, data locality, drift time, logical characteristics, or physical characteristics). Sampling from the different pools of data units can be performed with different probabilities. For example, the pool of data units having a higher drift time can have a higher probability of being sampled than a pool of data units having a lower drift time. In another example, a pool of "hot" data units can have a higher probability of being sampled that the pool of "cold" data units.

Figure 4:
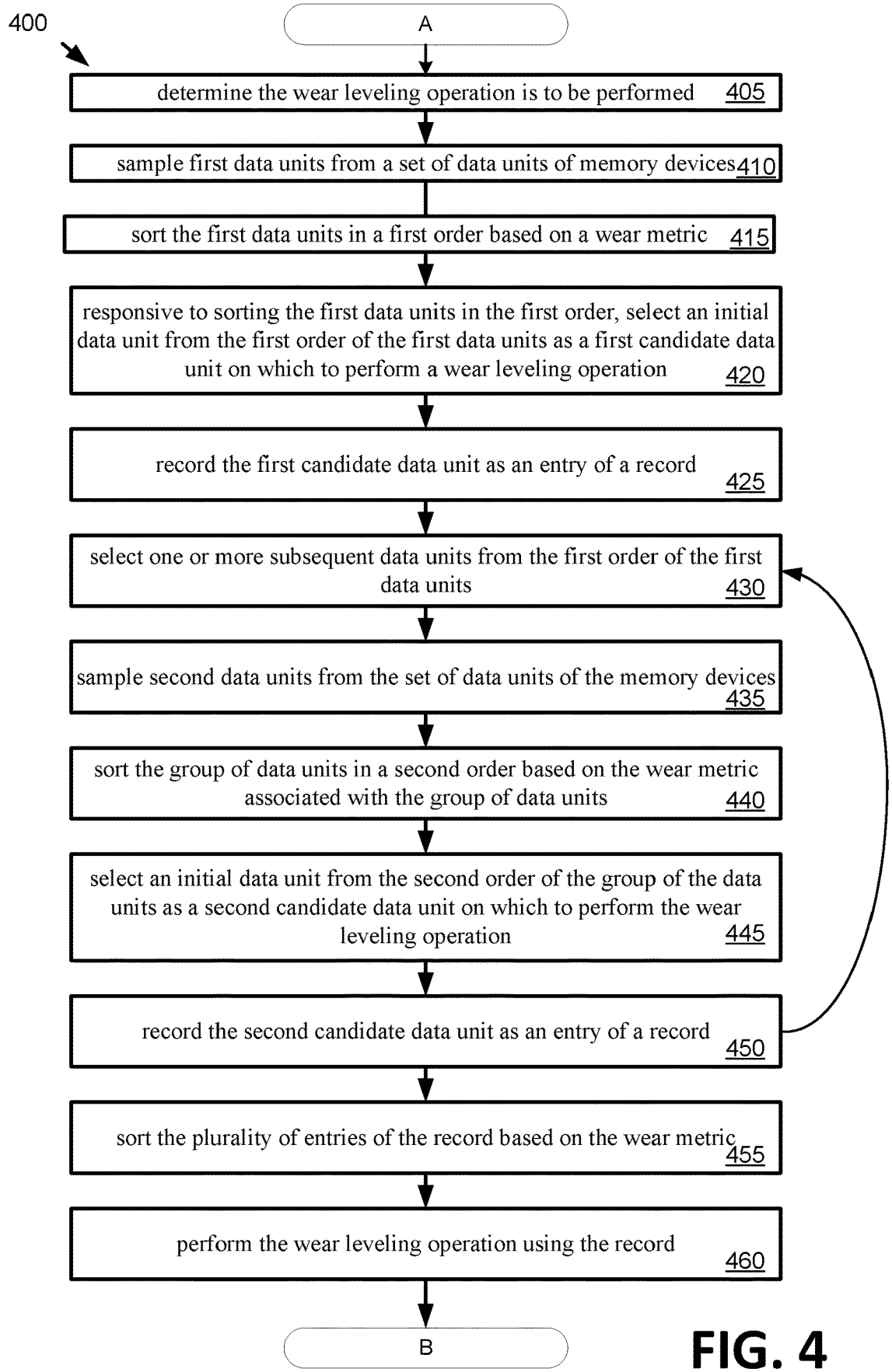
FIG. 4 is a flow diagram of an example method of the selection of one or more data units on which to perform a wear leveling operation, in accordance with some implementations.

FIG. 4 is a flow diagram of an example method illustrating the selecting of a data unit on which to perform a wear leveling operation, in accordance with some implementations. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 400 can be performed by the wear leveling management component 113 of FIG. 1. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various embodiments. Thus, not all operations are required in every implementation. Other process flows are possible. It can be noted that in other implementations, method 400 can include the same, different, additional, or fewer operations performed in the same or different order. Elements of the preceding Figures are used to help illustrated FIG. 4.

At block 405, processing logic determines that a wear leveling operation is to be performed on memory components 112A-112N. In implementations, different techniques can be used to determine that a wear leveling operation is to be performed. For example, the determination that wear leveling operation is to be performed can be frequency-based or time-based.

In implementations using a frequency-based technique, one or more wear leveling operations can be performed responsive to determining that a threshold number of memory operations (e.g., read operation, write operation, or combination of read and write operations) have been performed on behalf of the host system 120. For instance, responsive to determining the host system 120 has written to the memory sub-system 110 1000 times (e.g., 1000 write operations), wear leveling management component 113 can determine that one or more wear leveling operations are to be performed based on the aforementioned indication.

In implementations using a time-based technique, one or more wear leveling operations can be performed responsive to determining that a threshold number of memory operations have been performed over period of time on behalf of host system 120. For instance, responsive to determining that host system 120 has written to the memory sub-system 110 at least 100 times (e.g., 100 write operations) during a 5 minute period, wear leveling management component 113, can determine that one or more wear leveling operations are to be performed based on the aforementioned indication. It can be noted that the above examples of different techniques to determine that a wear leveling operation is to be performed are provided for illustration, rather than limitation, and that other techniques can be implemented in accordance with aspects of the present disclosure.

At block 410, processing logic samples data units 210 (e.g., first data units) from a set of data units 212 of memory components 112. The data units 210 are subset of the data set of data units 212. In some implementations, the data units 210 are sampled from the set of data units 212 of the memory components 112 using a biased sampling process that increases a probability that particular data units of the set of data units 212 are sampled based on one or more characteristics associated with the particular data units. In some implementations, the one or more characteristics that increase the probability that the particular data units of the set of data units are sampled include a frequency at which a memory operation is performed on the particular data units. In some implementations, the one or more characteristics that increase the probability that the particular data units of the set of data units are sampled include data locality of the particular data units. The sampling of data units is further described with respect to FIG. 2 and FIG. 3.

At block 415, processing logic sorts the data units 210 in a first order based on a wear metric associated with the data units 210. The wear metric is indicative of a level of physical wear of the data units. Wear metrics can include write count, read count, or a combination of write count and read count. For example, the wear metric can be a write count associated with the data units 210, and the data units 210 are sorted in an order from highest write count to lowest write count At block 420, responsive to sorting the data units 210 in the first order, processing logic selects an initial data unit (e.g., first data unit of the order) from the first order of the data units 210 as a first candidate data unit on which to perform a wear leveling operation. In some implementations, processing logic can perform the wear leveling operation on the first candidate data unit. In other implementations, processing logic can proceed to block 425. It can be noted that in some implementations, processing logic may not sort the data units 210. For example, processing logic can determine the initial data unit by scanning the data units 210 and determining the first candidate data unit having the highest wear metric (or lowest wear metric) based on the scanning.

At block 425, processing logic records the first candidate data unit as an entry of multiple entries in a record. The record can be stored in non-volatile memory or volatile memory.

At block 430, processing logic selects one or more subsequent data units from the first order of the data units 210. The one or more subsequent data units are selected to be part of a group of data units from which a second candidate data unit is selected.

At block 435, processing logic samples second data units from the set of data units 212 of the memory components 112. In implementations, one or more sampling techniques can be used to sample the second data units. In one implementation, the second data units are sampled using a biased sampling process. In one implementation, the number of data units sampled (second data units) can be the same or less than the number of sampled data units in block 410.

At block 440, processing logic sorts the group of data units in a second order based on the wear metric associated with the group of data units. The group of data units includes the second data units (e.g., block 435) and the one or more subsequent data units (e.g., block 430) from the first order of the data units 210.

At block 445, responsive to sorting the group of data units in the second order, processing logic selects an initial data unit from the second order of the group of the data units as a second candidate data unit on which to perform the wear leveling operation.

At block 450, processing logic records the second candidate data unit as an entry of the record. It can be noted by the dashed arrow that the selection of candidate data units can be repeated any number of times (e.g., processing logic returns to block 430). For example, processing logic can repeat the processes of block 430 through 450 until a threshold number of candidate data units are recorded in the record.

At block 455, processing logic sorts the entries of the record based on the wear metric. For example, the record can contain candidate data units that had maximum wear metrics with respect to the associated sorted groups and also contain candidate data units that had minimum (e.g., lowest) wear metrics with respect to the associated sorted groups. A sorted record can contain both data units that had maximum wear metrics and data units that had minimum wear metrics. In implementations, the wear metrics of the data units of a particular record have the same wear metric (e.g., all the data units of a particular record were sampled based on a write count). In some implementations, different records can be kept for data units sampled using different wear metrics (e.g., a record of data units having maximum or minimum read counts and another record of data units having maximum or minimum write counts). In other implementations, a record can be kept for data units having maximum wear metrics and another record can be kept for data units having minimum wear metrics.

At block 460, processing logic performs the wear leveling operation using entries of the record. For example, processing logic can perform the wear leveling operation using the first entry (e.g., data unit with the maximum wear metric of the sorted record) and the last entry (e.g., data unit with minimum wear metric of the sorted record). For example, processing logic can swap the data of the candidate data unit of the first entry having the highest wear metric with the data of the candidate data unit of the last entry having the lowest wear metric. In implementations, a wear leveling operation can be performed on any pair of entries of the record.

Figure 5:
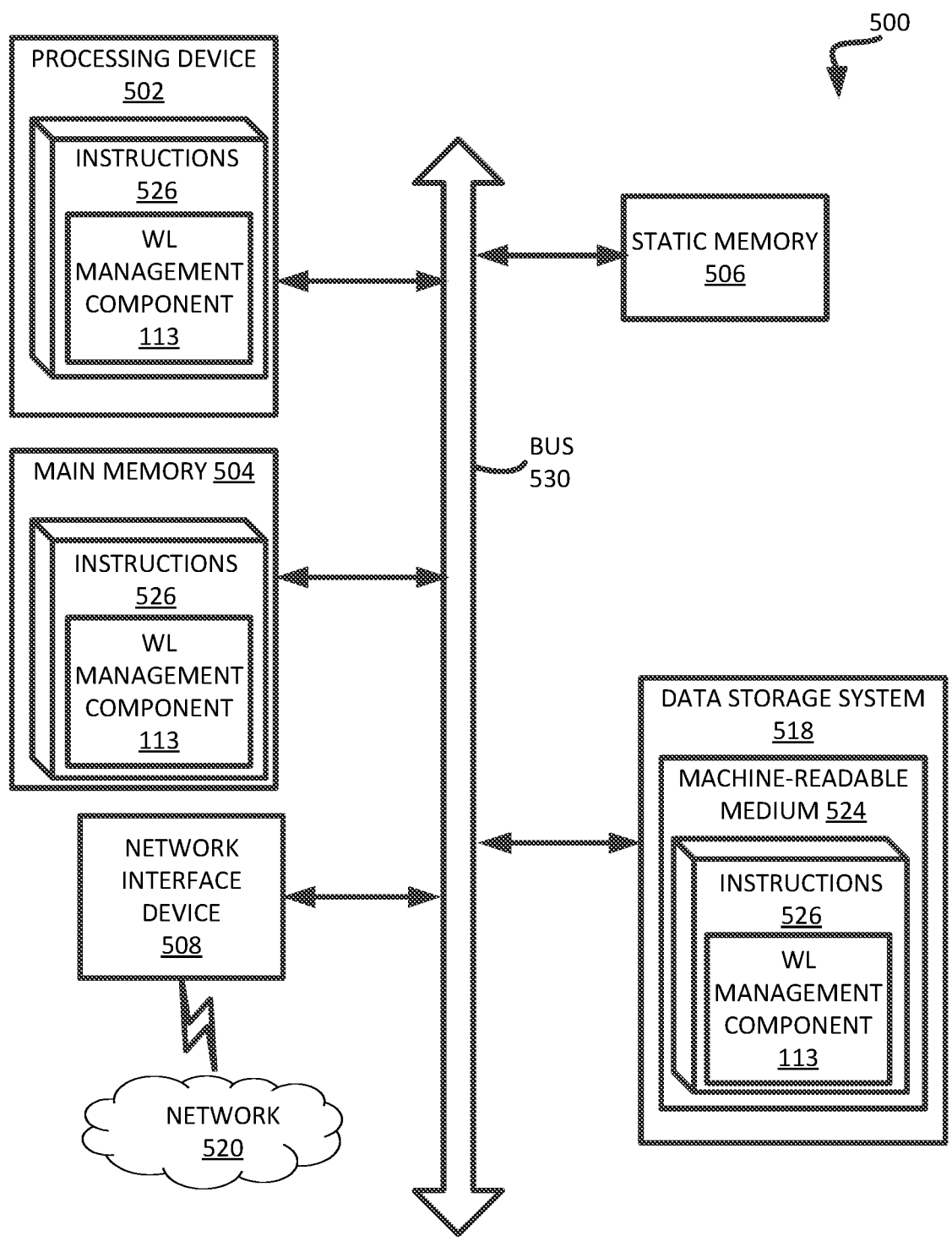
FIG. 5 is a block diagram of an example machine of a computer system in which implementations of the disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear leveling management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a wear leveling component (e.g., the wear leveling management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

What is claimed is:

1. A system comprising:
   a memory device; and
   a processing device, coupled to the memory device, the processing device to:
     sample first data units from a set of data units of the memory device, wherein the first data units comprise a subset of the set of data units;
     sort the first data units that were sampled from the set of data units into a first order based on a wear metric associated with the first data units, wherein the wear metric is indicative of a level of physical wear of the first data units;
     responsive to sorting the first data units, determine an initial data unit from the first data units as a first candidate data unit based on the wear metric associated with the first data units; and
     perform a wear leveling operation in view of the first candidate data unit.

2. The system of claim 1, wherein the first data units are sampled from the set of data units of the memory device using a biased sampling process that increases a probability that particular data units of the set of data units are sampled based on one or more characteristics associated with the particular data units.

3. The system of claim 2, wherein the one or more characteristics that increase the probability that the particular data units of the set of data units are sampled comprise a frequency at which a memory operation is performed on the particular data units.

4. The system of claim 2, wherein the one or more characteristics that increase the probability that the particular data units of the set of data units are sampled comprise data locality of the particular data units.

5. The system of claim 1, the processing device further to:
   select one or more subsequent data units from the first order of the first data units, wherein the one or more subsequent data units are selected to be part of a group of data units from which a second candidate data unit is selected.

6. The system of claim 5, the processing device further to:
   sample second data units from the set of data units of the memory device;
   sort the group of data units in a second order based on the wear metric associated with the group of data units, wherein the group of data units comprise the second data units and the one or more subsequent data units from the first order of the first data units; and
   responsive to sorting the group of data units in the second order, select an initial data unit from the second order of the group of the data units as a second candidate data unit on which to perform the wear leveling operation.

7. The system of claim 1, wherein the first candidate data unit has a highest wear metric of the first data units, and wherein to perform the wear leveling operation in view of the first candidate data unit, the processing device is further to:
   rewrite data of the first candidate data unit having the highest wear metric to another data unit having a lower wear metric than the first candidate data unit.

8. The system of claim 1, the processing device further to:
   record the first candidate data unit as an entry of a plurality of entries in a record;
   sort the plurality of entries of the record based on the wear metric; and
   perform the wear leveling operation using a first entry and a last entry of the sorted entries of the record.

9. The system of claim 1, the processing device further to:
   determine the wear leveling operation is to be performed based on a number of memory operations performed on behalf of a host system.

10. The system of claim 1, wherein the wear metric comprises a write count associated with the first data units.

11. The system of claim 10, wherein the first data units are sorted in a first order from highest write count to lowest write count, and wherein the initial data unit selected as the first candidate data unit has the highest write count.

12. The system of claim 10, wherein the wear metric comprises a combination of the write count and a read count associated with the first data units.

13. A method, comprising:
    sampling, by a processing device, first data units from a set of data units of a memory device, wherein the first data units comprise a subset of the set of data units;
    sorting the first data units that were sampled from the set of data units into a first order based on a wear metric associated with the first data units, wherein the wear metric is indicative of a level of physical wear of the first data units;
    responsive to sorting the first data units, determining an initial data unit from the first data units as a first candidate data unit based on the wear metric associated with the first data units, wherein the wear metric is indicative of a level of physical wear of the first data units; and
    perform a wear leveling operation in view of the first candidate data unit.

14. The method of claim 13, wherein the first data units are sampled from the set of data units of the memory device using a biased sampling process that increases a probability that particular data units of the set of data units are sampled based on one or more characteristics associated with the particular data units.

15. The method of claim 13, further comprising:
selecting one or more subsequent data units from the first order of the first data units, wherein the one or more subsequent data units are selected to be part of a group of data units from which a second candidate data unit is selected.

16. The method of claim 15, further comprising:
sampling second data units from the set of data units of the memory device;
sorting the group of data units in a second order based on a wear metric associated with the group of data units, wherein the group of data units comprise the second data units and the one or more subsequent data units from the first order of the first data units; and
responsive to sorting the group of data units in the second order, selecting an initial data unit from the second order of the group of the data units as a second candidate data unit on which to perform the wear leveling operation.

17. A non-transitory computer-readable medium comprising instructions that, responsive to execution by a processing device, cause the processing device to perform operations comprising:
sampling, by the processing device, first data units from a set of data units of a memory device using a biased sampling process that increases a probability of sampling particular data units of the set of data units with a higher wear metric, wherein a wear metric is indicative of a level of physical wear of the first data units;
sorting the first data units that were sampled from the set of data units in a first order based on the wear metric associated with the first data units; and
responsive to sorting the first data units in the first order, selecting an initial data unit from the first order of the first data units as a first candidate data unit on which to perform a wear leveling operation.

18. The non-transitory computer-readable medium of claim 17, the operations further comprising:
selecting one or more subsequent data units from the first order of the first data units, wherein the one or more subsequent data units are selected to be part of a group of data units from which a second candidate data unit is selected.

19. The non-transitory computer-readable medium of claim 18, the operations further comprising:
sampling second data units from the set of data units of the memory device;
sorting the group of data units in a second order based on a wear metric associated with the group of data units, wherein the group of data units comprise the second data units and the one or more subsequent data units from the first order of the first data units; and
responsive to sorting the group of data units in the second order, selecting an initial data unit from the second order of the group of the data units as a second candidate data unit on which to perform the wear leveling operation.

* * * * *